(12) United States Patent
Franconi

(10) Patent No.: US 7,845,575 B2
(45) Date of Patent: Dec. 7, 2010

(54) TEMPERATURE-ACTUATED VALVE ASSEMBLY

(75) Inventor: Robert B. Franconi, New Hartford, CT (US)

(73) Assignee: Honeywell International Inc., Morristown, NJ (US)

( * ) Notice: Subject to any disclaimer, the term of this patent is extended or adjusted under 35 U.S.C. 154(b) by 681 days.

(21) Appl. No.: 11/778,462

(22) Filed: Jul. 16, 2007

(65) Prior Publication Data
US 2009/0020168 A1 Jan. 22, 2009

(51) Int. Cl.
*G05D 23/02* (2006.01)

(52) U.S. Cl. ............ 236/93 R; 236/99 R; 236/100; 236/99 E; 236/99 J

(58) Field of Classification Search ....... 236/93 R, 236/99 E, 99 J, 99 R, 100; 137/468
See application file for complete search history.

(56) References Cited

U.S. PATENT DOCUMENTS

| | | | |
|---|---|---|---|
| 3,229,588 A | 1/1966 | Czernek | |
| 3,242,820 A | 3/1966 | Brandstadter | |
| 3,300,135 A | 1/1967 | Slater et al. | |
| 3,533,596 A | 10/1970 | Daume | |
| 3,687,160 A | 8/1972 | Erickson et al. | |
| 3,865,128 A | 2/1975 | Zadoo | |
| 3,911,790 A | 10/1975 | Gaitten | |
| 3,963,042 A * | 6/1976 | Bible | 137/468 |
| 3,973,729 A | 8/1976 | Sliger | |
| 4,142,677 A | 3/1979 | Ludwig | |
| 4,320,872 A | 3/1982 | Frederick | |
| 4,460,324 A | 7/1984 | Van Appledorn | |
| 4,602,481 A | 7/1986 | Robinson | |
| 4,735,056 A | 4/1988 | Goodman | |
| 5,197,285 A | 3/1993 | Dunwoody | |
| 6,634,395 B1 | 10/2003 | Mitchell | |
| 6,871,668 B2 | 3/2005 | Moreno et al. | |
| 6,889,705 B2 | 5/2005 | Newman et al. | |
| 6,988,672 B2 | 1/2006 | Axe | |

* cited by examiner

*Primary Examiner*—Cheryl J Tyler
*Assistant Examiner*—Jonathan Bradford
(74) *Attorney, Agent, or Firm*—Ingrassia Fisher & Lorenz, P.C.

(57) ABSTRACT

A temperature-actuated valve assembly is provided, which includes a valve assembly housing having a main flow passage and a control flow passage. A pneumatically-actuated valve is fluidly coupled to the control flow passage and configured to control fluid flow through the main flow passage. A first thermostatic valve is in thermal communication with the main flow passage and configured to control fluid flow through the control flow passage to position the pneumatically-actuated valve.

18 Claims, 6 Drawing Sheets

US 7,845,575 B2

TEMPERATURE-ACTUATED VALVE ASSEMBLY

TECHNICAL FIELD

The present invention relates generally to valve assemblies and, more particularly, to a temperature-actuated valve assembly suitable for deployment on an aircraft.

BACKGROUND

Temperature-actuated valve assemblies, which open or close at a predetermined temperature, are known in a wide variety of industries. In the avionics field, temperature-actuated valve assemblies are commonly employed as over-temperature shutoff valves in aircraft bleed air systems. Such over-temperature shutoff valves are configured to close, and thus protect temperature-sensitive downstream components, when the fluid conducted by the valve assembly becomes too hot. Over-temperature shutoff valves of this type may employ thermal fuse plugs made of eutectic alloys that abruptly melt at a predetermined actuation temperature. The eutectic fuse plug may maintain a spring-loaded flapper (or other such valve element) in an open position. When the bleed air heats the eutectic fuse plug to its melting point, the fuse plug melts, and the flapper is permitted to swing shut.

Though over-temperature shutoff valves of the type described above are effective for decreasing airflow when bleed air surpasses a particular temperature threshold, the eutectic plugs employed by such shutoff valves require replacement after valve actuation (i.e., valve tripping). In addition, such control valves cannot be tested to ensure proper operation without heating and melting the eutectic plug. Although over-temperature shutoff valves have been developed that employ non-perishable temperature-sensitive elements (e.g., shape memory alloy actuators), such over-temperature shutoff valves may still require manual intervention to be reset.

Considering the foregoing, it is desirable to provide a temperature-actuated valve assembly (e.g., an over-temperature shutoff valve) configured to actuate (e.g., close) when the fluid flowing through the assembly exceeds a first predetermined temperature. It would also be desirable if such a valve assembly were configured to automatically reset (e.g., re-open) when the fluid cools below the first predetermined temperature or, perhaps, a second predetermined temperature that is lower (or higher) than the first predetermined temperature. Other desirable features and characteristics of the present invention will become apparent from the subsequent detailed description of the invention and the appended claims, taken in conjunction with the accompanying drawings and this background of the invention.

BRIEF SUMMARY

A temperature-actuated valve assembly is provided, which includes a valve assembly housing having a main flow passage and a control flow passage. A pneumatically-actuated valve is fluidly coupled to the control flow passage and configured to control fluid flow through the main flow passage. A first thermostatic valve is in thermal communication with the main flow passage and configured to control fluid flow through the control flow passage to position the pneumatically-actuated valve.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
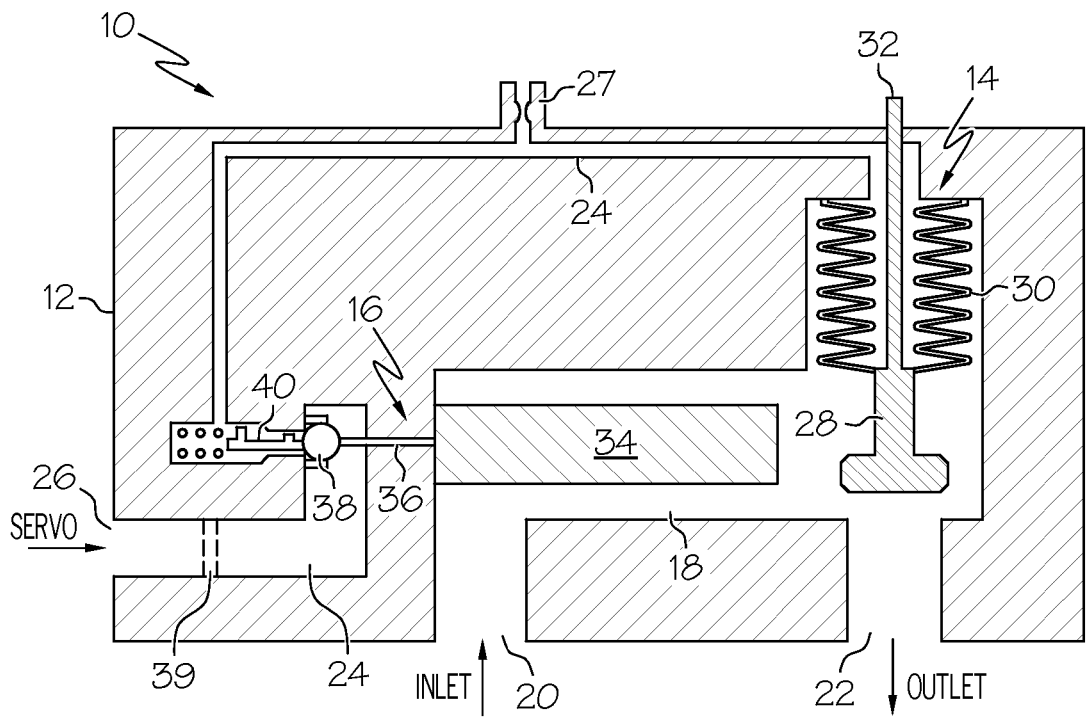
FIGS. 1 and 2 are cross-sectional views of a temperature-actuated valve assembly in open and closed states, respectively, in accordance with a first exemplary embodiment.
Figure 2:
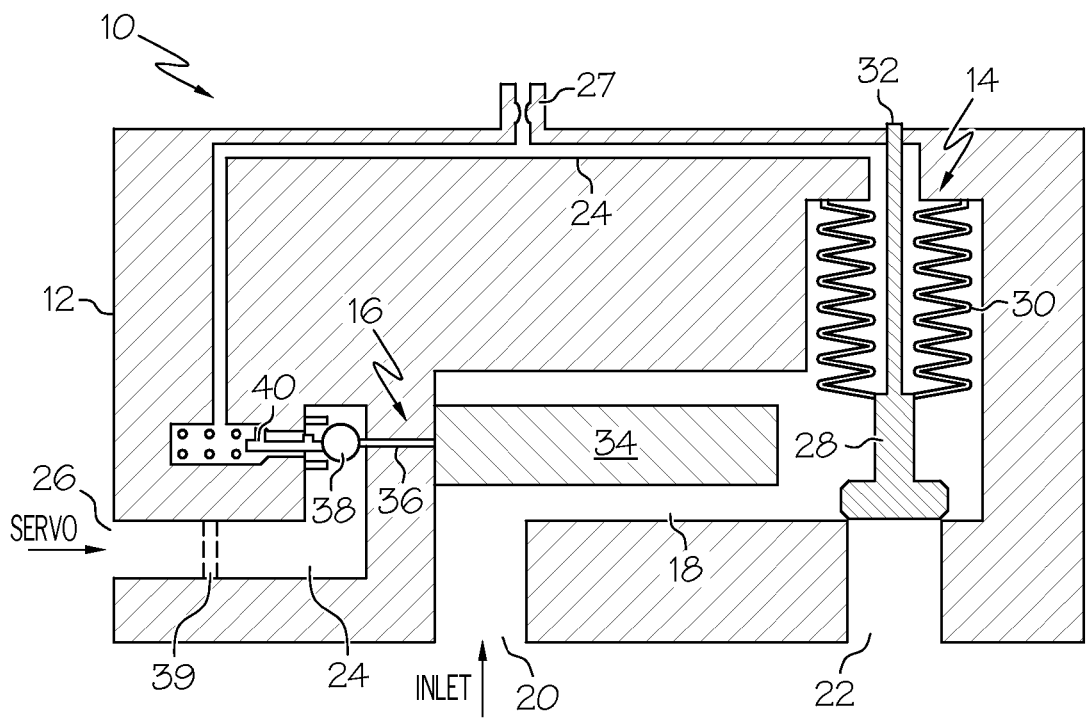

FIGS. 1 and 2 are cross-sectional views of a temperature-actuated valve assembly 10 in open and closed states, respectively, in accordance with a first exemplary embodiment. Temperature-actuated valve assembly 10 may be utilized as, for example, an over-temperature shutoff valve in an aircraft bleed air system or as an oil vent valve associated with an aircraft turbine engine. Temperature-actuated valve assembly 10 comprises a valve assembly housing 12, a pneumatically-actuated valve 14, and a thermostatic valve 16. Two flow passages are formed through valve assembly housing 12; i.e., (1) a main flow passage 18, which includes an inlet 20 and an outlet 22, and (2) a control flow passage 24, which includes an inlet 26 and an outlet fluidly coupled to pneumatically-actuated valve 14. In the exemplary embodiment shown in FIGS. 1 and 2, control flow passage 24 is distinct from (i.e., does not connect with) main flow passage 18; however, in alternative embodiments, control flow passage 24 may be fluidly coupled to, and receive fluid from, main flow passage 18. Furthermore, as indicated in FIGS. 1 and 2 at 27, control flow passage 24 may be vented to an ambient pressure source to decrease the likelihood of inadvertent actuation of valve 14 due to leakage through thermostatic valve 16.

Pneumatically-actuated valve 14 is disposed proximate main flow passage 18 and controls the flow of fluid (e.g., pressurized air) therethrough. Pneumatically-actuated valve 14 is configured to move between an open position (FIG. 1) wherein valve 14 permits fluid flow through main flow passage 18 and a closed position (FIG. 2) wherein valve 14 substantially prevents fluid flow through passage 18. In the illustrated exemplary embodiment, pneumatically-actuated valve 14 is depicted as a poppet-style valve. In particular, valve 14 is shown as including a plunger 28 and a flexible bellows 30, which is coupled between an interior surface of valve assembly housing 12 and plunger 28 and which inherently biases plunger 28 toward the open position shown in FIG. 1. Bellows 30 may be formed from any suitable material; however, for high temperature applications, bellows 30 is preferably made from a metal or alloy (e.g., a nickel-based alloy). Pneumatically-actuated valve 14 also includes a rod 32, which is coupled to plunger 28 and which extends through bellows 30 and housing 12. Rod 32 provides a visual indication of the position of plunger 28 visible from the exterior of temperature-actuated valve assembly 10.

By employing a zero-leakage device, such as bellows 30, valve assembly 10 decreases the likelihood that debris (e.g., carbon, oil, etc.) will pass between main flow passage 18 and control flow passage 24. For example, if the fluid flowing through main flow passage 18 is laden with oil (as may be the case when valve assembly 10 is employed as an oil vent valve), bellows 30 may prevent oil from flowing into control flow passage 24, coking, and consequently interfering with the operation of thermostatic valve 16 or other components of valve assembly 10. To further decrease the likelihood of flow passage contamination, control flow passage 24 may receive fluid from a clean fluid source, such as a control servo fluidly coupled to an aircraft engine compressor. In addition, the fluid supplied to control flow passage 24 may be pressurized relative to the fluid within main flow passage 18. In this manner, any leakage path that may form between the flow passages will flow from control passage 24 to main flow passage 18. Finally, if desired, one or more debris-filtering screens 39 may be disposed within control passage 24.

Thermostatic valve 16 controls the flow of fluid through control flow passage 24 and, therefore, the position of pneumatically-actuated valve 14. In the illustrated exemplary embodiment, thermostatic valve 16 comprises a thermal actuator 34 and a pushrod 36 having a ball stopper 38 in contact with an end thereof. Pushrod 36 is translatably coupled to thermal actuator 34 and may slide relative thereto between two positions; i.e., a closed position (FIG. 1) wherein ball stopper 38 impedes fluid flow through control flow passage 24, and an open position (FIG. 2) wherein stopper 38 permits fluid flow through passage 24 and into bellows 30 of pneumatically actuated valve 14. As will be appreciated by one skilled in the art, thermal actuator 34 may comprise a conventional bimetallic device including two or more metals having different coefficients of thermal expansion. Alternatively, thermal actuator 34 may comprise a shape memory alloy device (e.g., copper-zinc-aluminum, copper-aluminum-nickel, or nickel-titanium alloy) that undergoes a phase transformation (e.g., from the martensite to the austenite structure) at a predetermined temperature. If desired, thermal actuator 34 may also include a spring-loaded pintle (not shown) to prevent over travel of ball stopper 38. These examples notwithstanding, it should be appreciated that thermal actuator 34 may comprise any device suitable for actuating a valve element (e.g., a ball stopper, a butterfly valve plate, etc.) at a desired temperature.

Thermostatic valve 16 is preferably mounted within valve assembly housing 12 so as to facilitate thermal communication with the fluid flowing through main flow passage 18. For example, as indicated in FIGS. 1 and 2, thermostatic valve 16 may protrude into main flow passage 18 such fluid flowing through main flow passage 18 will flow around and substantially immerse thermal actuator 34. Thermostatic valve 16 normally resides in the closed position (FIG. 1) and thus prevents fluid from flowing through control flow passage 24 and entering bellows 30 of pneumatically-actuated valve 14. However, when the fluid within main flow passage 18 exceeds a predetermined temperature, thermostatic valve 16 transitions to an open position. To facilitate this transition, an auxiliary device, such as a spring-loaded pintle 40, may be disposed within housing 12 and bias ball stopper 38 toward the open position. When thermostatic valve 16 opens in this manner, fluid is permitted to flow through control flow passage 24 and into bellows 30. Bellows 30 consequently expands, plunger 28 descends into the closed position (FIG. 2), and fluid flow through main flow passage 18 ceases. When the fluid temperature within main flow passage 18 again falls below the threshold temperature, valve assembly 10 automatically resets (i.e., re-opens). That is, when the fluid temperature cools below the threshold temperature, thermostatic valve 16 closes, bellows 30 returns to its non-deformed shape, plunger 28 ascends to the open position (FIG. 1), and fluid flow through main flow passage 18 resumes.

Temperature-actuated valve assembly 10 has thus been described as being configured to close when the fluid flowing through main flow passage 18 exceeds a predetermined temperature and automatically reset (i.e., re-open) when the fluid temperature falls below the same predetermined temperature. While this configuration may be desirable for many applications, it may sometimes be preferable for the temperature-actuated valve assembly to close (or open) when the fluid reaches a first predetermined temperature and subsequently reset when the fluid reaches a second predetermined temperature, which is substantially different than the first predetermined threshold. For example, if utilized as a fire suppression device, the temperature-actuated valve assembly is preferably configured to close when the fluid temperature exceeds a first high predetermined temperature threshold (e.g., approximately 450° to 500° Celsius (842° to 932° Fahrenheit)) and only re-open when the fluid temperature cools below a second low predetermined temperature threshold (e.g., approximately 350° to 400° Celsius (662° to 752° Fahrenheit)). In this manner, the temperature-actuated valve assembly may ensure that fluid flow is halted for a time period sufficient to extinguish any fire that could potentially occur downstream of the valve assembly. Although the temperature-actuated valve assembly may be able to achieve such a dual-temperature characteristic utilizing a single thermostatic valve having a high thermal and mechanical hysteresis, it is preferable that the temperature-actuated valve assembly employs first and second thermostatic valves that actuate at different predetermined temperatures. An example of such a temperature-actuated valve assembly is described below in conjunction with FIGS. 3-7.

Figure 3:
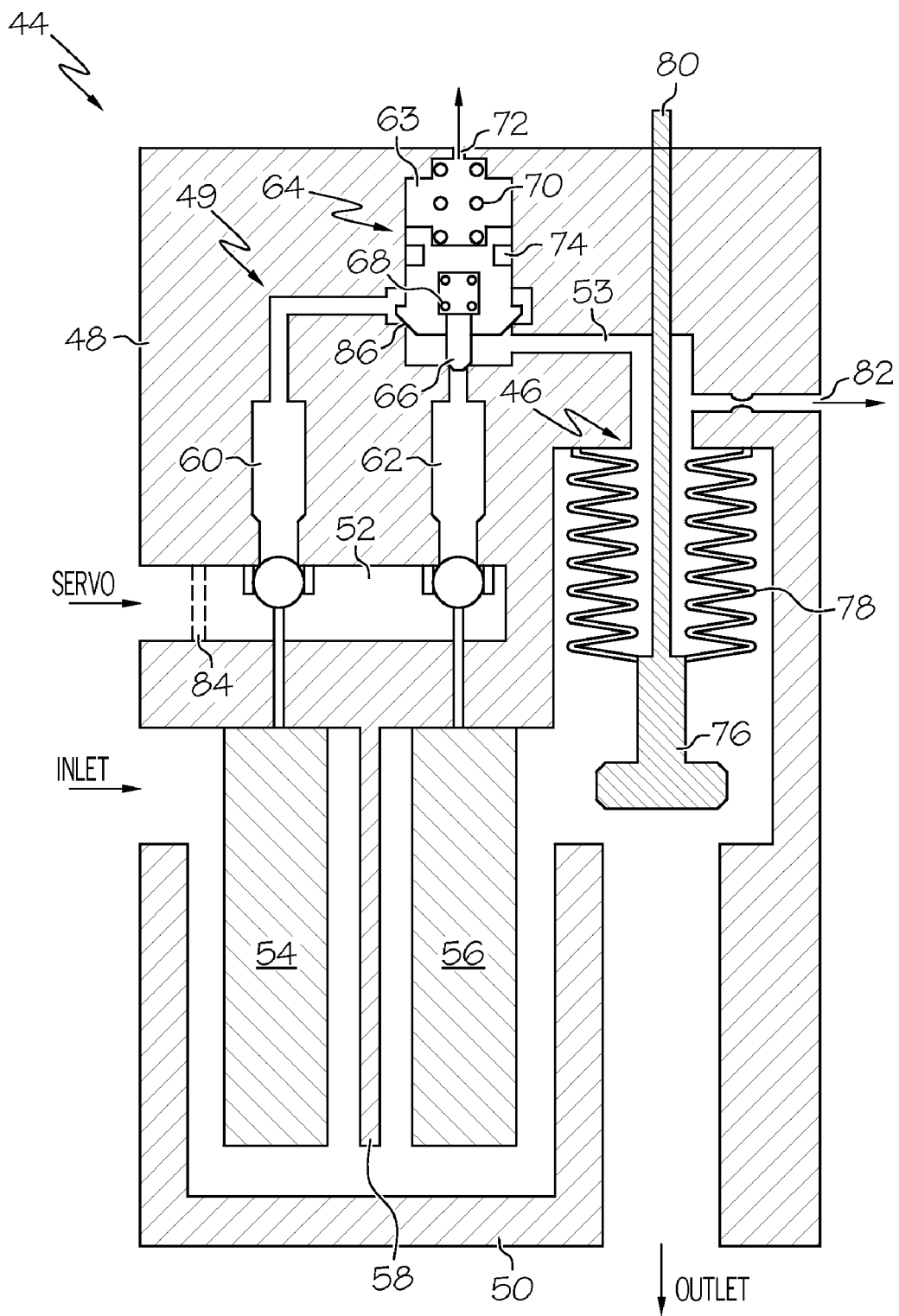
FIG. 3 is a cross-sectional view of a temperature-actuated valve assembly in accordance with a second exemplary embodiment.

FIG. 3 is a cross-sectional view of a temperature-actuated valve assembly 44 in accordance with a second exemplary embodiment. Temperature-actuated valve assembly 44 is similar to valve assembly 10 described above in conjunction with FIGS. 1 and 2; e.g., valve assembly 44 comprises a pneumatically-actuated valve 46 that is mounted in a valve assembly housing 48 having a main flow passage 50 and a control flow passage 49, which includes an upstream servo pressure portion 52 and a downstream control pressure portion 53. As was the case previously, pneumatically-actuated valve 46 may comprise a plunger 76, a bellows 78 (or other such zero leakage device), and a visual-indication rod 80. Bellows 78 is fluidly coupled to downstream control pressure portion 53 and normally biases plunger 76 toward the open position shown in FIG. 3. However, when fluid (e.g., pressurized air) flows through downstream control pressure portion 53 of control flow passage 49 and into bellows 78, bellows 78 deforms and plunger 76 descends into a closed position. To facilitate the return of plunger 76 to the open position, downstream control pressure portion 53 of control flow passage 49 may be vented as shown in FIG. 3 at 82.

In contrast to valve assembly 10, which included a single thermostatic valve, temperature-actuated valve assembly 44 includes two thermostatic valves, valves 54 and 56, which are each configured to actuate (e.g., open) at different predetermined temperatures. Thermostatic valves 54 and 56 are mounted in valve assembly housing 48 for thermal communication with the fluid flowing through main flow passage 50. For example, thermostatic valves 54 and 56 may be disposed such that at least a portion of each valve (e.g., the thermal actuator) protrudes into the main flow passage 50. In addition, main flow passage 50 may include one or more physical features (e.g., a partition 58), which condition the flow pattern through main flow passage 50 to better immerse thermostatic valves 54 and 56 in the fluid flowing through passage 50.

Upstream servo pressure portion 52 of control flow passage 49 is bifurcated into first and second branches 60 and 62. Branches 60 and 62 each feed into a common switching valve 64, the output of which is fluidly coupled to downstream control pressure portion 53 of control flow passage 49. Switching valve 64 is slidably disposed within a chamber 63 provided between upstream servo pressure portion 52 and downstream control pressure portion 53 of control flow passage 49. During the operation of valve assembly 44, switching valve 64 selectively impedes fluid flow through first and second braches 60 and 62. A spring 70 biases switching valve 64 toward a first position (shown in FIG. 3) wherein valve 64 substantially prevents fluid flow through branch 60. However, as will be described below in more detail in conjunction with FIGS. 4-7, switching valve 64 transitions to a second position wherein valve 64 substantially permits fluid flow through branch 60 when thermostatic valve 56 opens and pressurized fluid flows through branch 62. If desired, switching valve 64 may be equipped with a plunger 66, which may be biased toward an extended position by a spring 68, so as to decrease fluid leakage through branch 62. In addition, a non-elastomeric (e.g., carbon, metal, etc.) piston ring 74 may be circumferentially disposed around the body of switching valve 64 to minimize leakage through vent 72.

Pneumatically-actuated valve assembly 44 is well-suited for utilization as an oil vent valve for at least two reasons. First, valve assembly 44 is capable of reliably operating in high temperature environments (e.g., applications wherein temperatures may exceed 500° Celsius (932° Fahrenheit)) providing that the components of assembly 44 are formed from appropriate materials (e.g., bellows 78 may be formed from a nickel-based alloy, valve housing stainless steel, piston seat carbon stainless steel, or the like). Second, valve assembly 44 may be configured to eliminate or minimize cross-flow passage contamination when the fluid flowing through main flow passage 50 carries a substantial amount of debris (e.g., oil, carbon, etc.). For example, upstream servo pressure portion 52 of control flow passage 49 may be supplied with a clean fluid source, which may have a higher pressure than the fluid flowing through main flow passage 50, and one or more filter screens 84 may be disposed within control flow passage 49.

Figure 4:
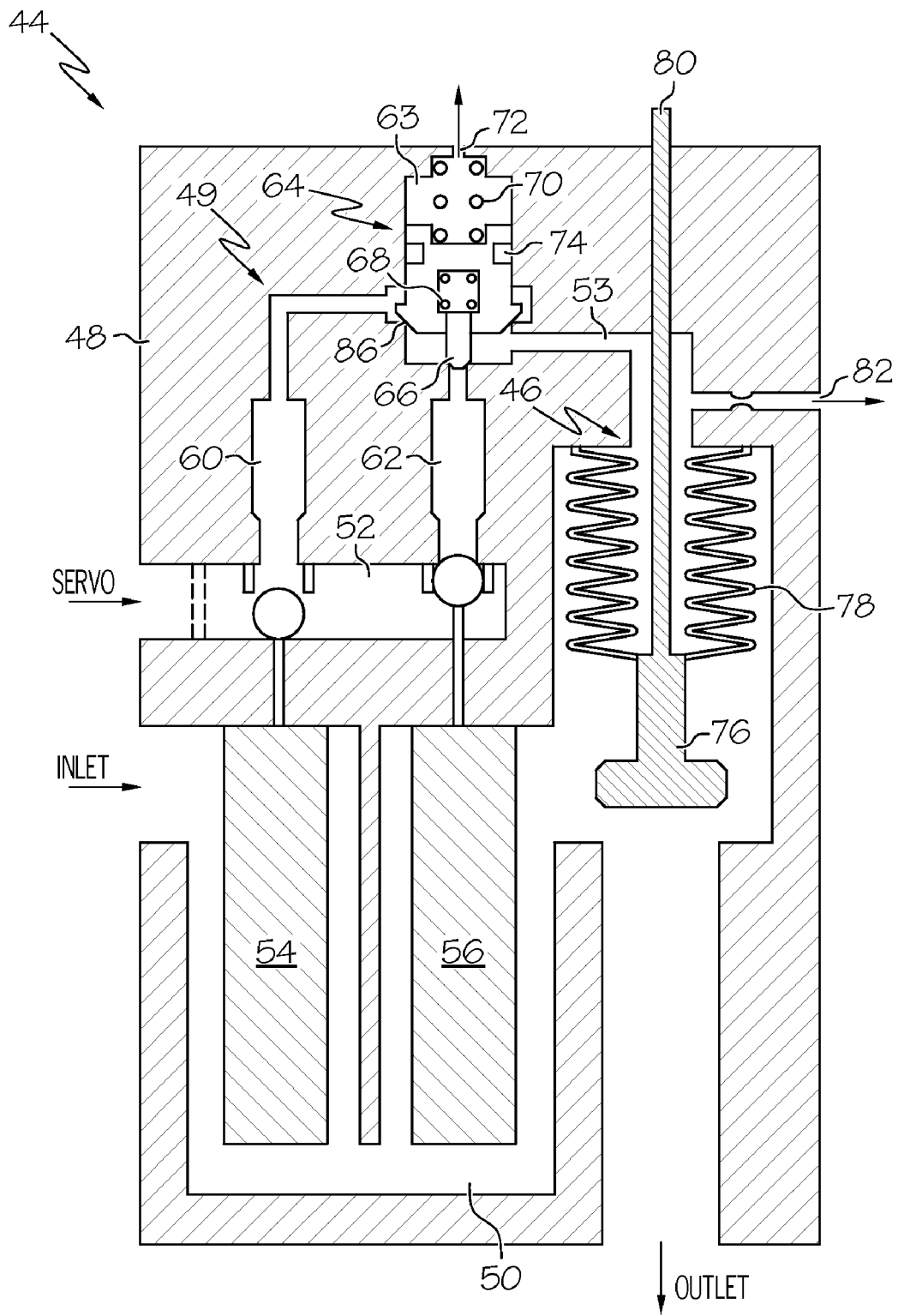
FIGS. 4-7 are cross-sectional views of the temperature-actuated valve assembly shown in FIG. 3 illustrating the valve assembly at various stages of operation.

The operation of temperature-actuated valve assembly 44 will now be discussed in conjunction with FIG. 3 along with FIGS. 4-7, which illustrate valve assembly 44 during various stages of operation. Referring first to FIG. 3, when the fluid within main flow passage is below both the low predetermined temperature (i.e., the temperature at which thermostatic valve 54 actuates) and the high predetermined temperature (i.e., the temperature at which thermostatic valve 56 actuates), pneumatically-actuated valve 46 remains in the open position. However, as indicated in FIG. 4, when the fluid temperature rises above the low predetermined temperature, thermostatic valve 54 moves into the open position and pressurized fluid is permitted to enter branch 60 of control flow passage 49. Although not shown in FIGS. 3-7 for clarity, a spring-loaded pintle, similar to pintle 40 described above in conjunction with FIGS. 1 and 2, may be provided to urge thermostatic valve 54 toward the open position. The pressurized fluid is prevented from reaching pneumatically-actuated valve 46 by switching valve 64, which remains in its fully seated position shown in FIG. 4. Importantly, switching valve 64 is pressure balanced with respect to branch 60 (e.g., the surface area of the seated portion 86 of valve 64 may be substantially equivalent to that of piston ring 74). Switching valve 64 thus remains in the closed, seated position.

Figure 5:
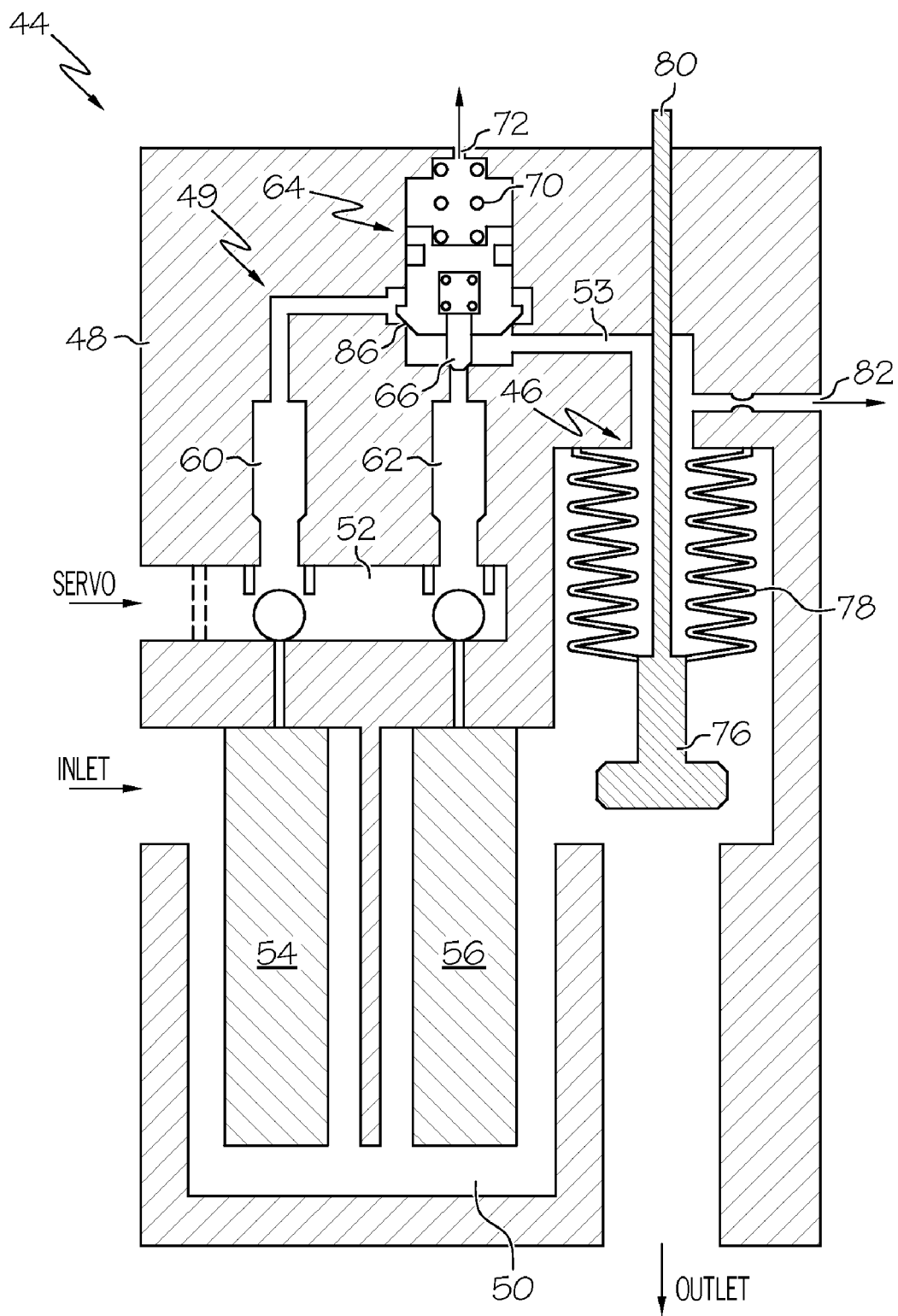
Figure 6:
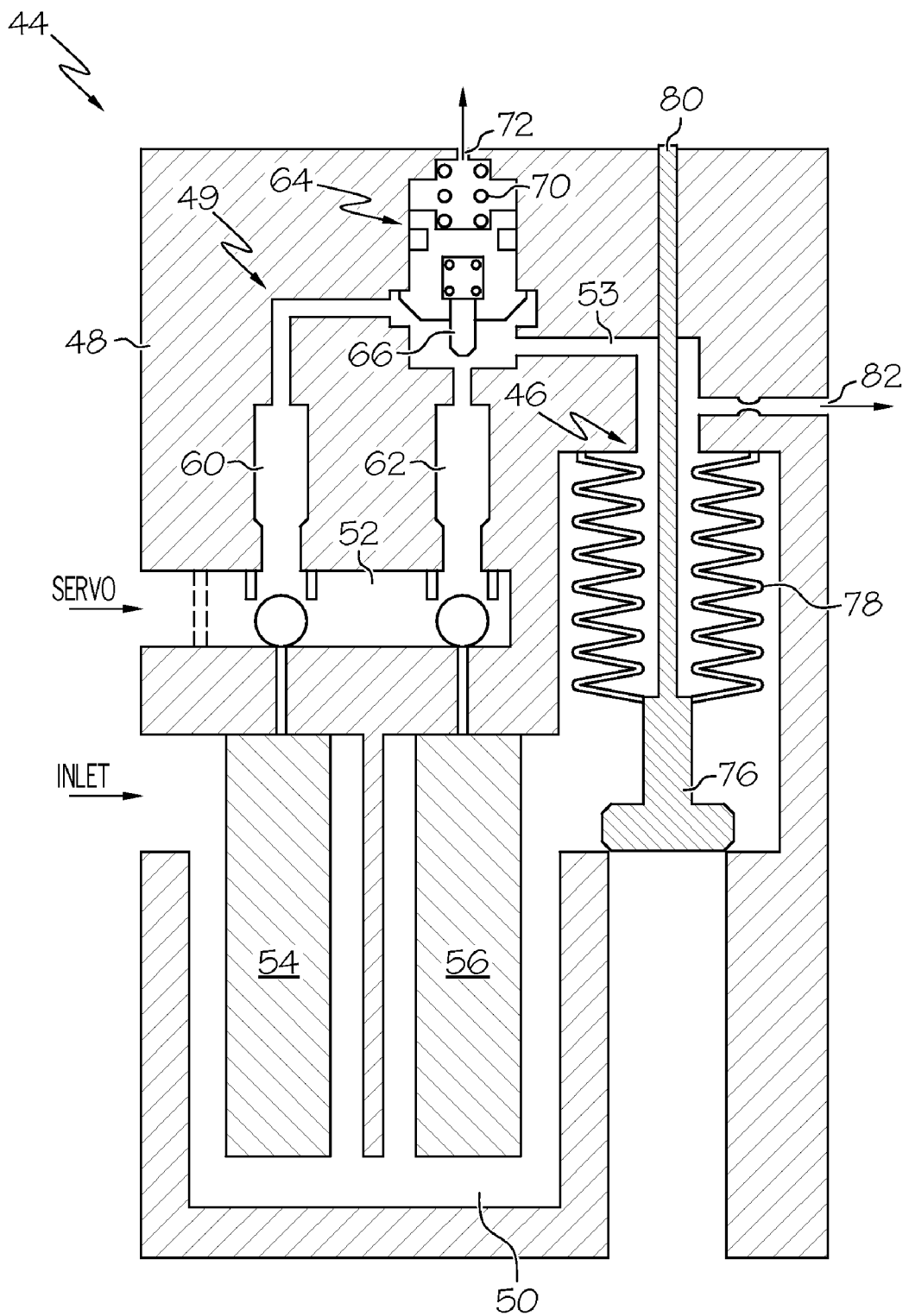
Figure 7:
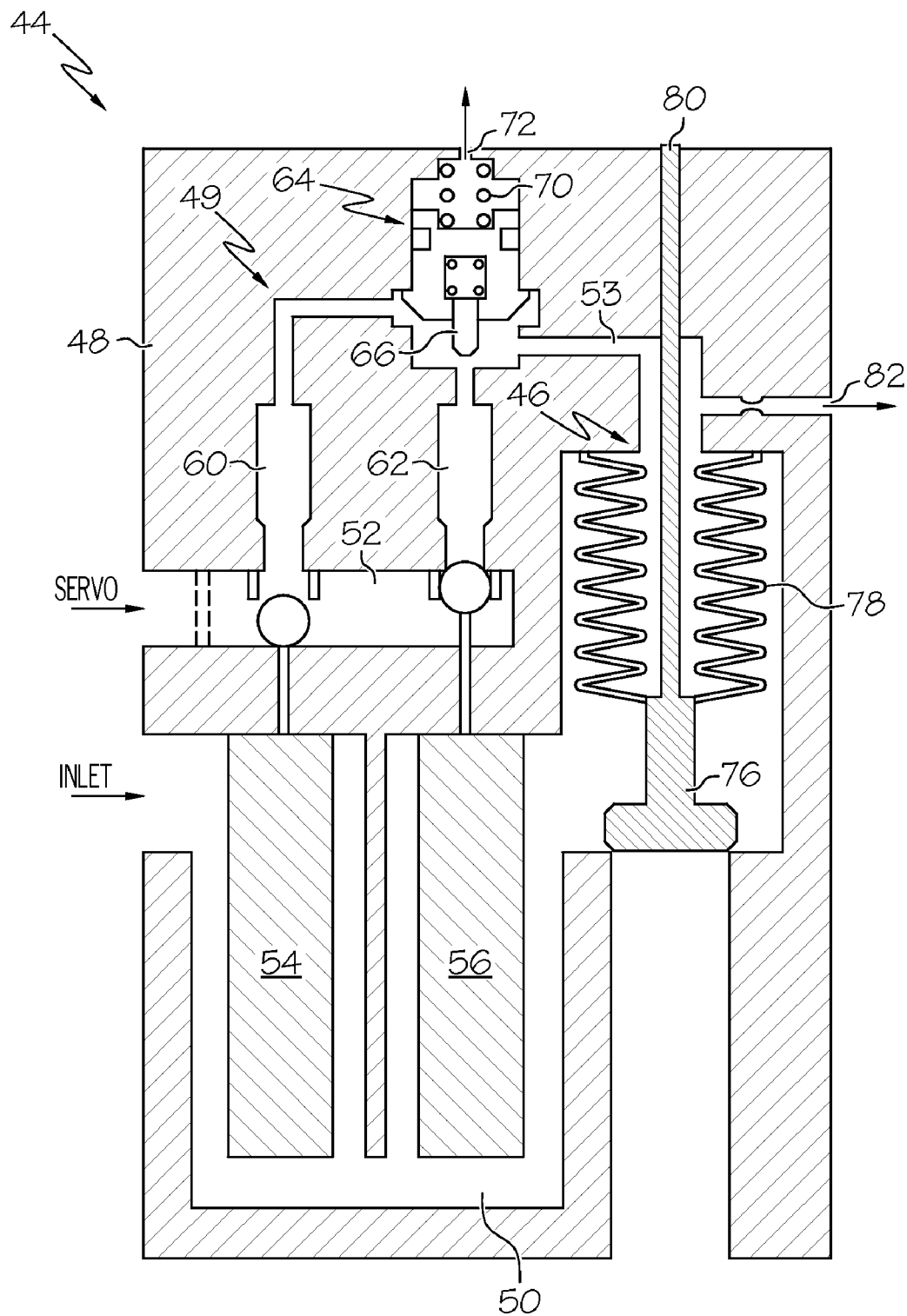

Referring now to FIG. 5, when the temperature of the fluid flowing through flow passage 50 reaches the high predetermined temperature, thermostatic valve 56 moves to the open position (again, a non-illustrated spring-loaded pintle may be provided to aid in this transition). This permits pressurized fluid to flow into branch 62 of control flow passage 49 and force plunger 66 of switching valve 64 upward. The pressurized fluid then acts on the lower face of switching valve 64 thereby moving valve 64 from its seated position into the position shown in FIG. 6. When switching valve 64 has been moved into this position, pressurized fluid is permitted to flow through branch 60 and 62 into bellows 78 of pneumatically-actuated valve 46. Bellows 78 expands, plunger 76 descends into the closed position, and fluid flow through main flow passage 50 ceases. Temperature-actuated valve assembly 44 has thus closed when the temperature of fluid flowing through main flow passage 50 has reached the high predetermined temperature threshold.

As stated above, temperature-actuated valve assembly 44 is configured to automatically reset (i.e, re-open) when the temperature within main flow passage 50 decreases below the low predetermined temperature. This may be appreciated by referring to FIG. 7, which illustrates the condition of valve assembly 44 after the temperature of the fluid flowing through passage 50 has dropped below the high predetermined temperature. As can be seen, thermostatic valve 56 has returned to the closed position; however, pneumatically-actuated valve 46 remains in the closed position. This is because, the fluid flowing through branch 60 of control flow passage 49 may act upon the entire face of valve 64 and thus maintain switching valve 64 in the position shown in FIGS. 6 and 7. As a result, fluid may continue to flow through branch 60 and into bellows 78 of pneumatically-actuated valve 46. It is only when the fluid temperature drops below the low predetermined temperature that thermostatic valve 54 closes, bellows 78 retracts, and pneumatically-actuated valve 46 returns to the open position shown in FIG. 3.

It should thus be appreciated that a temperature-actuated valve assembly has been provided that is configured to actuate (e.g., close) when the fluid flowing through the assembly exceeds a first predetermined temperature and automatically reset (e.g., re-open) when the fluid cools below a second predetermined temperature, which may be lower than the first predetermined temperature. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A temperature-actuated valve assembly, comprising:
   a valve assembly housing including a main flow passage and a control flow passage;
   a pneumatically-actuated valve fluidly coupled to the control flow passage and configured to control fluid flow through the main flow passage; and
   a thermostatic valve in thermal communication with the main flow passage and configured to control fluid flow through the control flow passage to position the pneumatically-actuated valve;
   wherein the pneumatically-actuated valve is configured to close when receiving pressurized fluid from the control flow passage, and wherein the thermostatic valve is configured to open when the fluid within the main flow passage exceeds a predetermined temperature.

2. A temperature-actuated valve assembly according to claim 1 wherein the thermostatic valve comprises:
   a thermal actuator;
   a pushrod translatably coupled to the thermal actuator; and
   a ball stopper coupled to an end of the pushrod.

3. A temperature-actuated valve assembly according to claim 1 wherein the first thermostatic valve protrudes into the main flow passage.

4. A temperature-actuated valve assembly according to claim 1 wherein the pneumatically-actuated valve is a poppet-type valve.

5. A temperature-actuated valve assembly according to claim 1 wherein the pneumatically-actuated valve comprises:
   a plunger; and
   a bellows coupled between the plunger and an interior surface of the valve assembly housing, the bellows fluidly coupled to the control flow passage.

6. A temperature-actuated valve assembly according to claim 5 wherein the plunger is movable between an open position and a closed position, and wherein the bellows biases the plunger toward the open position.

7. A temperature-actuated valve assembly, comprising:
   a valve assembly housing including a main flow passage and a control flow passage;
   a pneumatically-actuated valve fluidly coupled to the control flow passage and configured to control fluid flow through the main flow passage;
   a first thermostatic valve in thermal communication with the main flow passage and configured to control fluid flow through the control flow passage, the first thermostatic valve configured to actuate at a first predetermined temperature; and
   a second thermostatic valve in thermal communication with the main flow passage and configured to control fluid flow through the control flow passage, the second thermostatic valve configured to actuate at a second predetermined temperature, the second predetermined temperature higher than the first predetermined temperature.

8. A temperature-actuated valve assembly according to claim 7 wherein the first predetermined temperature is between approximately 350.degree. to 400.degree. Celsius.

9. A temperature-actuated valve assembly according to claim 8 wherein the second predetermined temperature is between approximately 450.degree. to 500.degree. Celsius.

10. A temperature-actuated valve assembly according to claim 7 wherein the control flow passage further comprises:
    a first branch; and
    a second branch;
    wherein the first thermostatic valve is configured to control fluid flow through the first branch, and wherein the second thermostatic valve is configured to control fluid flow through the second branch.

11. A temperature-actuated valve assembly according to claim 10 further comprising a switching valve disposed proximate the first branch and the second branch, the switching valve configured to control fluid flow through the first branch.

12. A temperature-actuated valve assembly according to claim 11 wherein the switching valve is pressure balanced with respect to the first branch when closed.

13. A temperature-actuated valve assembly according to claim 11 wherein the switching valve is configured to normally reside in a first position wherein the switching valve impedes fluid flow through at least the first branch.

14. A temperature-actuated valve assembly according to claim 13 wherein the switching valve is configured to transition to a second position wherein the switching valve permits fluid flow through the first branch when pressurized fluid flows through the second branch.

15. A temperature-actuated valve assembly according to claim 14 wherein the switching valve is configured to remain in the second position as long as pressurized fluid flows through at least one of the first branch and the second branch.

16. A temperature-actuated valve assembly, comprising:
    a valve assembly housing, comprising:
      a main flow passage; and
      a control flow passage including first and second branches;
    first and second thermostatic valves configured to control the fluid flow through the first and second branches, respectively, the first and second thermostatic valves in thermal communication with the main flow passage and each configured to open at a different predetermined temperature; and
    a pneumatically-actuated valve fluidly coupled to the control flow passage and controlling fluid flow through the main flow passage, the pneumatically-actuated valve configured to close when pressurized fluid flows through the main control flow passage.

17. A temperature-actuated valve assembly according to claim 16 further comprising a switching valve slidably mounted in the valve assembly housing proximate the first and second branches.

18. A temperature-actuated valve assembly according to claim 17 wherein the switching valve is configured to permit fluid flow through the control flow passage when the first and second thermostatic valves are each open.

* * * * *